(12) United States Patent
Zhao et al.

(10) Patent No.: US 12,130,248 B2
(45) Date of Patent: Oct. 29, 2024

(54) HEAT SOURCE SIMULATION STRUCTURE

(71) Applicant: ASIA VITAL COMPONENTS (CHINA) CO., LTD., Shenzhen (CN)

(72) Inventors: Xiao-Xiang Zhao, Shenzhen (CN); Chun-Lin Mao, Shenzhen (CN); Han-Min Liu, Shenzhen (CN)

(73) Assignee: ASIA VITAL COMPONENTS (CHINA) CO., LTD., Shenzhen (CN)

( * ) Notice: Subject to any disclaimer, the term of this patent is extended or adjusted under 35 U.S.C. 154(b) by 252 days.

(21) Appl. No.: 17/190,342

(22) Filed: Mar. 2, 2021

(65) Prior Publication Data
US 2022/0283106 A1 Sep. 8, 2022

(51) Int. Cl.
*G01N 25/20* (2006.01)
*H05B 3/00* (2006.01)
(Continued)

(52) U.S. Cl.
CPC .......... *G01N 25/20* (2013.01); *H05B 3/0019* (2013.01); *H05B 3/08* (2013.01); *H05B 3/12* (2013.01);
(Continued)

(58) Field of Classification Search
CPC .... G01N 25/20; H05B 2203/016; H05B 3/00; H05B 3/0019; H05B 3/08; H05B 3/12; H05B 3/40
See application file for complete search history.

(56) References Cited

U.S. PATENT DOCUMENTS

| 7,637,659 | B2 | 12/2009 | Liu et al. |
| 2007/0071063 | A1* | 3/2007 | Liu .................. G01N 25/20 |
| | | | 374/15 |

(Continued)

FOREIGN PATENT DOCUMENTS

| CN | 107205104 A | 9/2017 |
| CN | 207235136 U | 4/2018 |

(Continued)

OTHER PUBLICATIONS

Search Report dated Feb. 13, 2022, issued by Taiwan Intellectual Property Office for counterpart Application No. 110103858, 1 page.
(Continued)

*Primary Examiner* — Janie M Loeppke
*Assistant Examiner* — Theodore J Evangelista
(74) *Attorney, Agent, or Firm* — Bradley J. Thorson; DeWitt LLP

(57) ABSTRACT

A heat source simulation structure includes a heating body and a heating member to form a simulation heat source main body for conducting heat. The simulation heat source main body is enclosed in an outer case and a heating substrate with electrical insulation and heat insulation properties to avoid dissipation of the heat. The heating member is electrically connected with an external power supply for heating the heating body. A thermocouple member is disposed on the heating body corresponding to the heating member. A temperature monitoring port is connected with a data collection meter for recording the temperature of the heating body. By means of the heat insulation design enclosing the simulation heat source main body, the contact thermal resistance between the heating member and the heating body is reduced, further to lower the heat loss of the heat source simulation structure and enhance the measurement precision and reliability.

8 Claims, 5 Drawing Sheets

(51) Int. Cl.
  *H05B 3/08*    (2006.01)
  *H05B 3/12*    (2006.01)
  *H05B 3/40*    (2006.01)

(52) U.S. Cl.
  CPC ......... *H05B 3/40* (2013.01); *H05B 2203/016* (2013.01)

(56) References Cited

U.S. PATENT DOCUMENTS

| | | | |
|---|---|---|---|
| 2015/0136753 A1* | 5/2015 | Cronn | A41D 13/0051 219/211 |
| 2020/0131459 A1* | 4/2020 | Baum | B01L 3/50853 |

FOREIGN PATENT DOCUMENTS

| | | | | |
|---|---|---|---|---|
| CN | 208156682 U | | 11/2018 | |
| CN | 109100392 A | * | 12/2018 | ............. G01N 25/20 |
| CN | 110290298 A | | 9/2019 | |
| DE | 202017103059 U1 | | 6/2017 | |
| TW | M279854 U | | 11/2005 | |
| TW | M613564 U | | 6/2021 | |

OTHER PUBLICATIONS

Search Report dated Jul. 3, 2024 issued by China National Intellectual Property Administration for counterpart application No. 2020100050805.

* cited by examiner

HEAT SOURCE SIMULATION STRUCTURE

BACKGROUND OF THE INVENTION

1. Field of the Invention

The present invention relates generally to a heat source technology field, and more particularly to a heat source simulation structure.

2. Description of the Related Art

In the recent years, sciences and technologies have rapidly developed. The operation frequency and speed of electronic devices have become higher and higher. Also, the integrated circuit has been more and more miniaturized so that the integrated circuit has higher and higher density. The power of the devices is increased along with the enhancement of the performance so that the heat generated per unit capacity has become higher and higher. Therefore, the heat dissipation problem has become more and more important. The performance of the high heat source is a critical factor affecting heat exchange test result. Therefore, in order to ensure that the electronic devices work normally without being affected by the heat energy, it is extremely important to perform heat source simulation test with respect to the performance of the high heat source product.

The current heat source simulation device for simulating heat generation of an electronic device employs ceramic heating plate, heating filament and heating block to form a heat source simulation device for simulating the electronic device to find out whether the heat generated by the electronic device is all carried away by the heat transfer device. However, the heat source simulation device has different structures and non-unified materials so that the entire heating structure is not a compatible design capable of uniformly heating. Instead, the respective heating modules will independently heat so that the heat transfer between the heating structure and the heat dissipation device can be hardly stabilized. This leads to a shortcoming of greater heat transfer loss. As a result, the measurement result fails to match the actual heat dissipation condition of the electronic device. The greater error will affect the measurement precision and reliability.

Moreover, in the above test method, the heating device itself has heat dissipation effect to a certain extent. Therefore, the heating amount is partially dissipated from the heating device. As a result, the precision of the measurement result is affected.

It is therefore tried by the applicant to provide a heat source simulation structure to solve the above problems and shortcomings of the conventional heat source simulation device. Accordingly, the heat source simulation structure of the present invention can solve the heating problem of the electronic device such as a chip.

SUMMARY OF THE INVENTION

It is therefore a primary object of the present invention to provide a heat source simulation structure includes a heating body and a heating member, which are coupled with each other to form a simulation heat source main body for conducting heat. The simulation heat source main body is enclosed in an outer case and a heating substrate with electrical insulation and heat insulation properties to avoid dissipation of the heat from the heat source main body (by way of heat radiation and environment radiation). This can reduce the heat loss of the heat source simulation structure. Also, the heating body is properly heated by the heating member so as to compensate the temperature of the heating body with the heat loss. Therefore, the affection to the measurement result is controllable so as to enhance the measurement precision and reliability.

It is a further object of the present invention to provide the above heat source simulation structure, in which the heating member and the heating body are connected by means of welding so as to avoid greater contact thermal resistance between the heating member and the heating body. In addition, the structure of the heat source simulation structure is simple and the operation is facilitated.

It is still a further object of the present invention to provide the above heat source simulation structure, which can be solely used or synchronously used with a test platform.

To achieve the above and other objects, the heat source simulation structure of the present invention includes: a carrier body, a temperature monitoring port being disposed on the carrier body; an outer case corresponding capped on the carrier body, the outer case and the carrier body together defining therebetween a receiving space; and a heat source main body including: a heating body disposed in the receiving space, at least one through hole being disposed on one side of the heating body; at least one heating member, one end of the heating member being disposed in the through hole of the heating body, the other end of the heating member extending out of the outer case to electrically connect with an external power supply for heating the heating body; and at least one thermocouple member disposed on one side of the heating body corresponding to the heating member.

In the above heat source simulation structure, the carrier body includes a base seat and a heating substrate disposed on one side of the base seat. The temperature monitoring port is disposed on the base seat. The receiving space is positioned between the outer case and the heating substrate.

In the above heat source simulation structure, one end of the heating member is disposed in the through hole of the heating body and the junction between the end of the heating member and the through hole is welded to connect the end of the heating member and the through hole.

In the above heat source simulation structure, a heating filament is disposed in the heating body.

In the above heat source simulation structure, the heating member and the heating body are made of a high-temperature-resistant material.

In the above heat source simulation structure, the heating body and the heating member are made of copper or stainless steel.

In the above heat source simulation structure, the heating member is an electrical heating pipe or a heating bar.

In the above heat source simulation structure, the temperature monitoring port is electrically connected with a data collection meter for recording the temperature of the upper surface of the heating body.

In the above heat source simulation structure, the outer case and the heating substrate are made of a high-temperature-resistant insulation material.

In the above heat source simulation structure, the outer case and the heating substrate are made of fiber glass with heat insulation and electrical insulation effect.

In the above heat source simulation structure, the outer case is disposed on one side of the heating body distal from the base seat for insulation and heat transfer.

In the above heat source simulation structure, the size and area of the heating body and the number of the heating member are substantially designed according to the actual value of the heating power and the size, area and configuration of the chip.

In the above heat source simulation structure, the through holes of the heating body extend in a lengthwise direction of the base seat or a widthwise direction of the base seat.

The above heat source simulation structure is solely used or synchronously used with a test platform.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
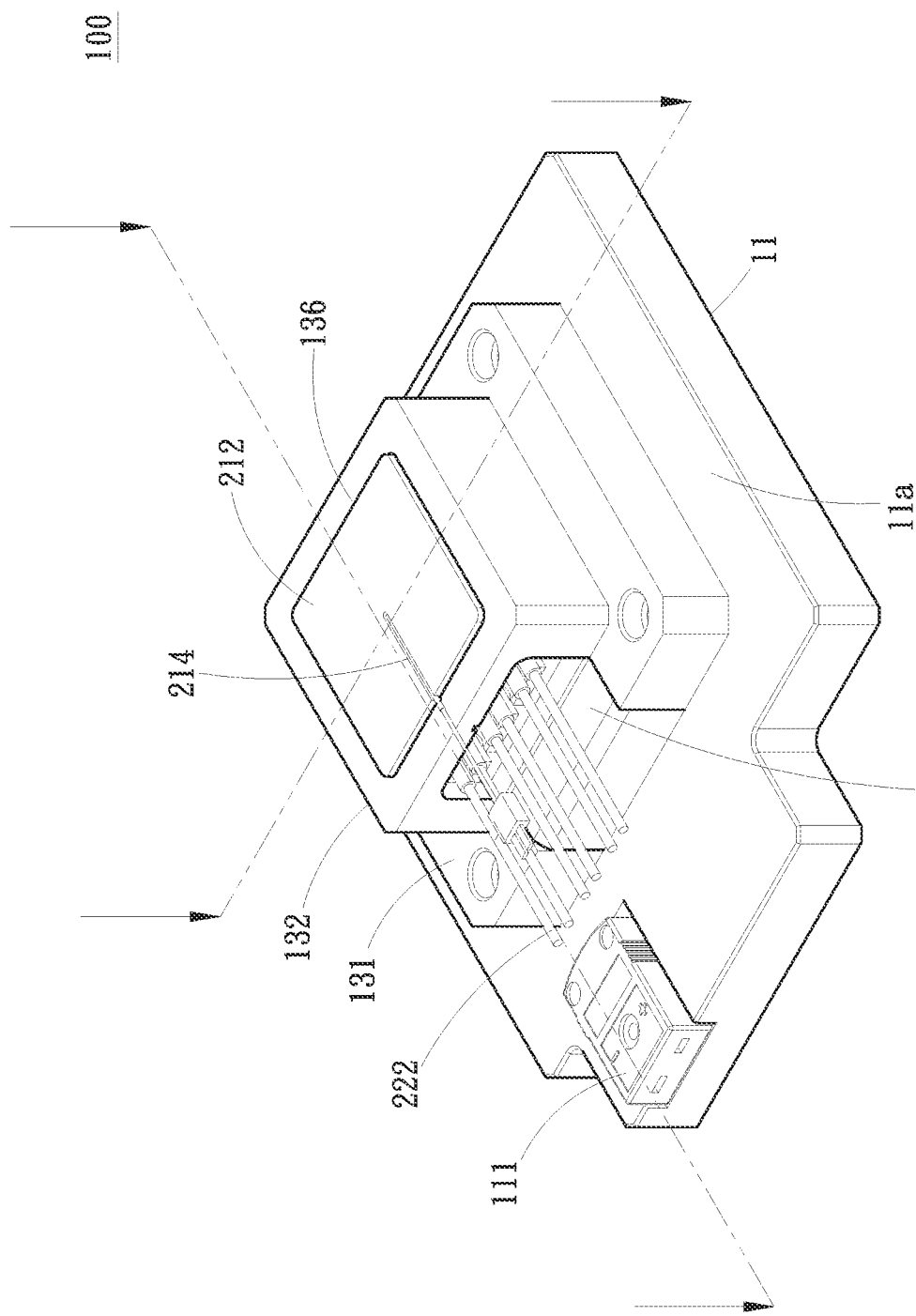
FIG. 1 is a perspective assembled view of the heat source simulation structure of the present invention.
Figure 2A:
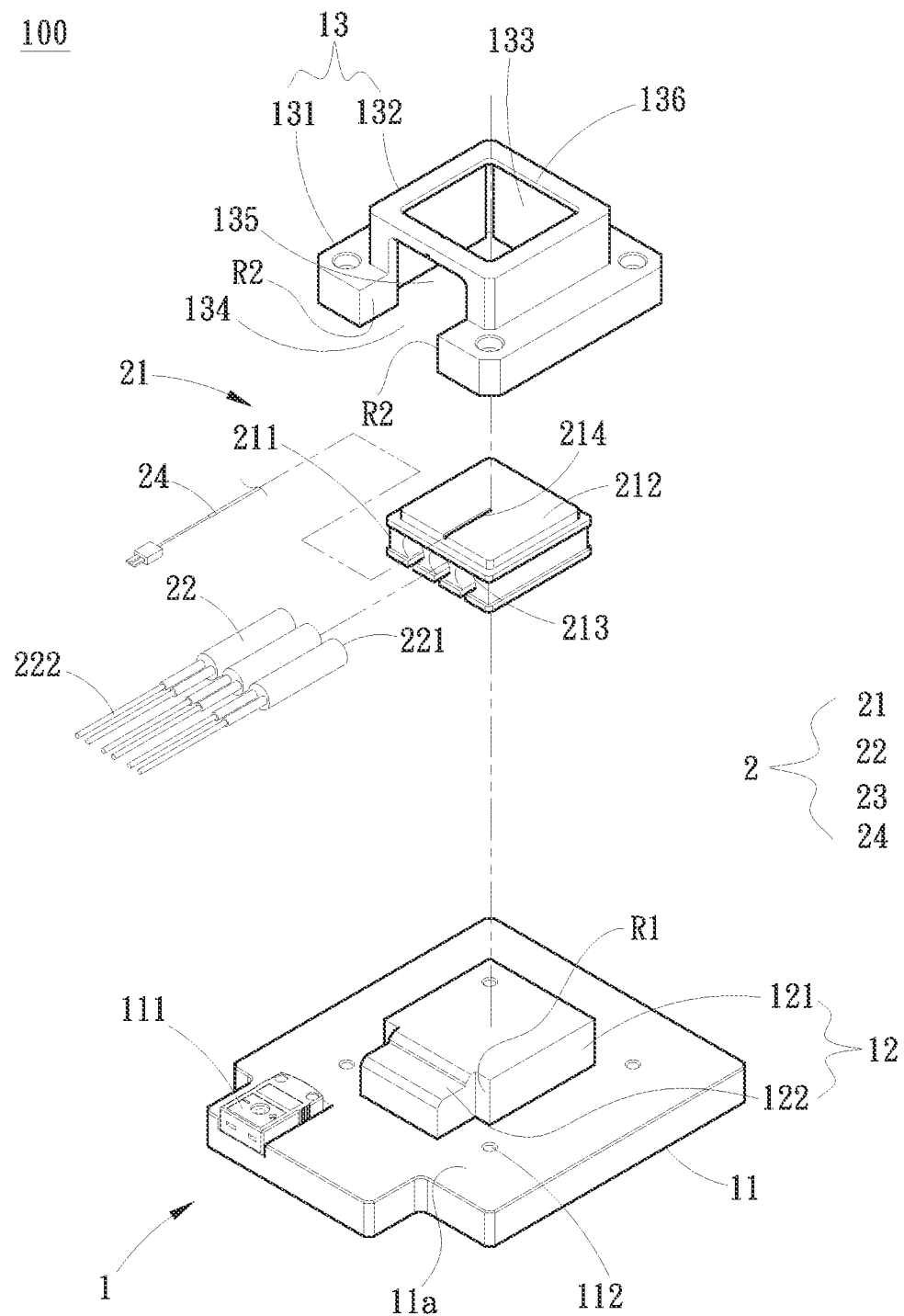
FIGS. 2A and 2B are perspective exploded views of two embodiments of the heat source simulation structure of the present invention.
Figure 2B:
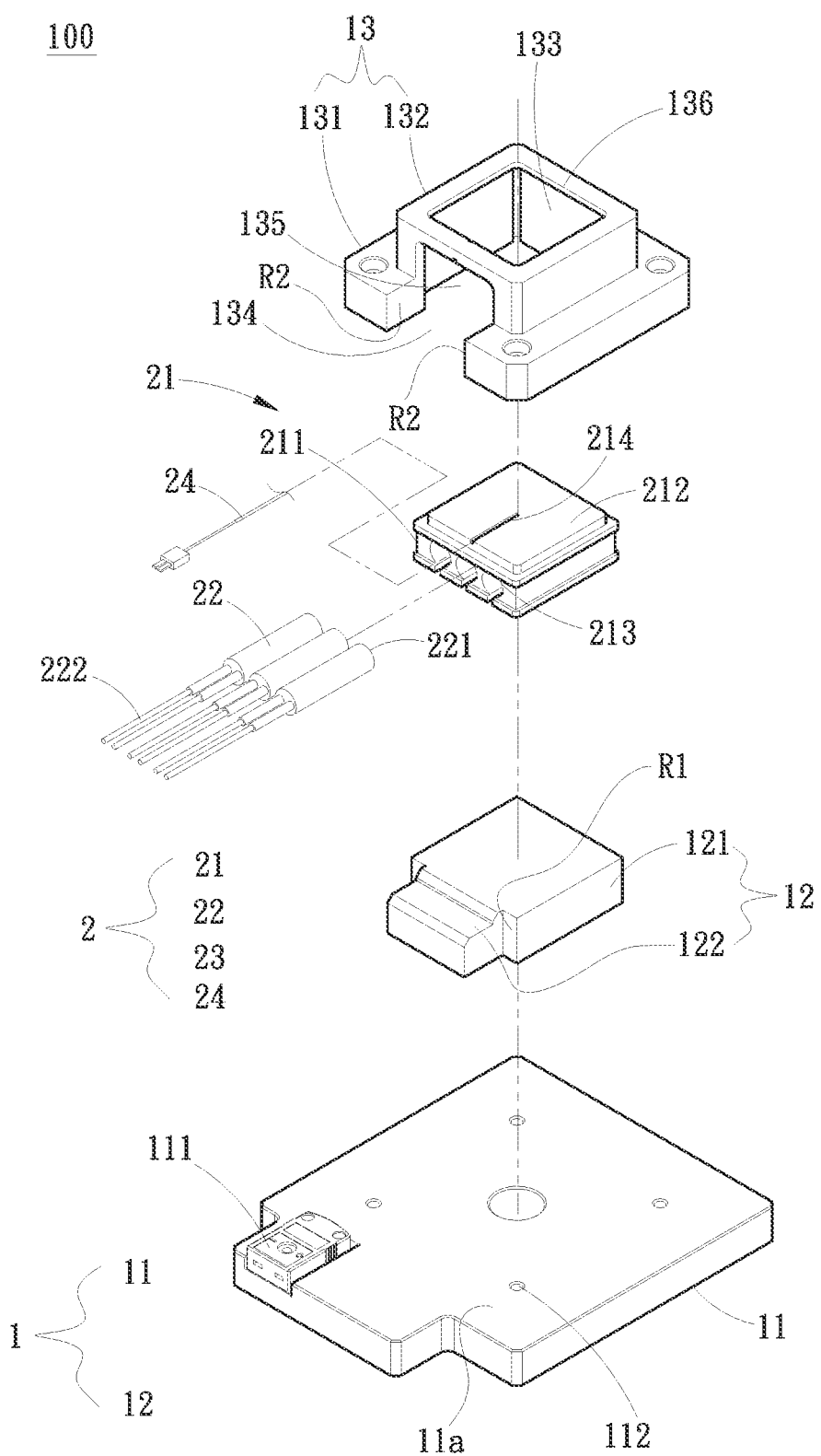
Figure 3:
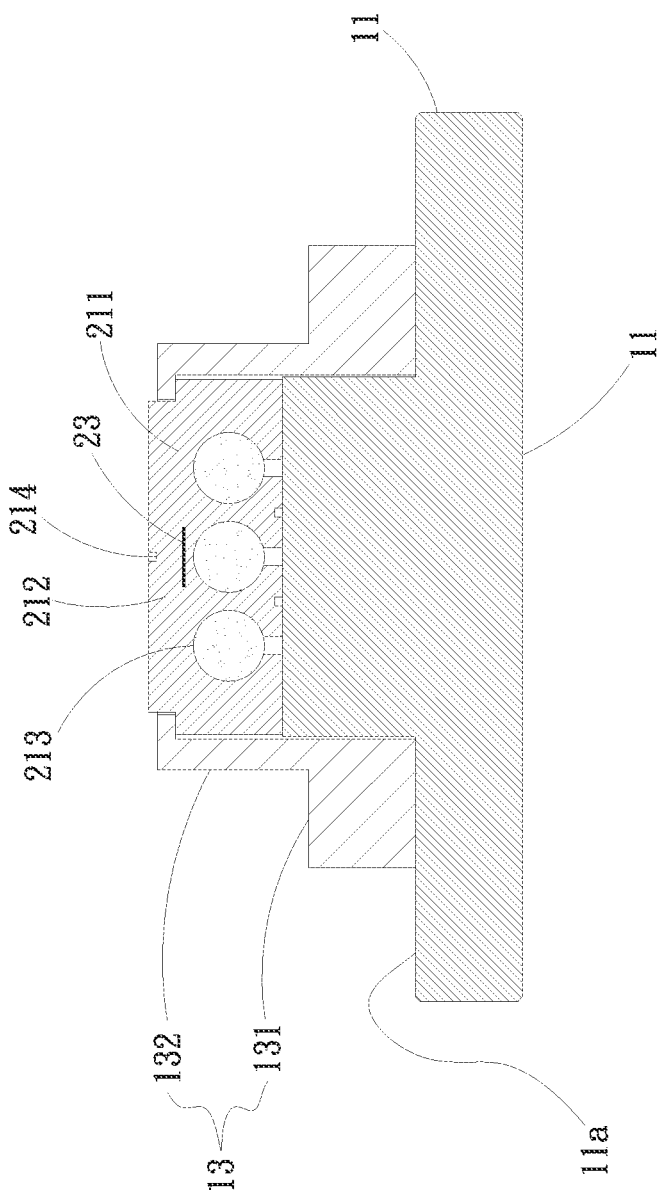
FIGS. 3 and 4 are partially sectional assembled views of the heat source simulation structure of the present invention according to FIG. 1.
Figure 4:
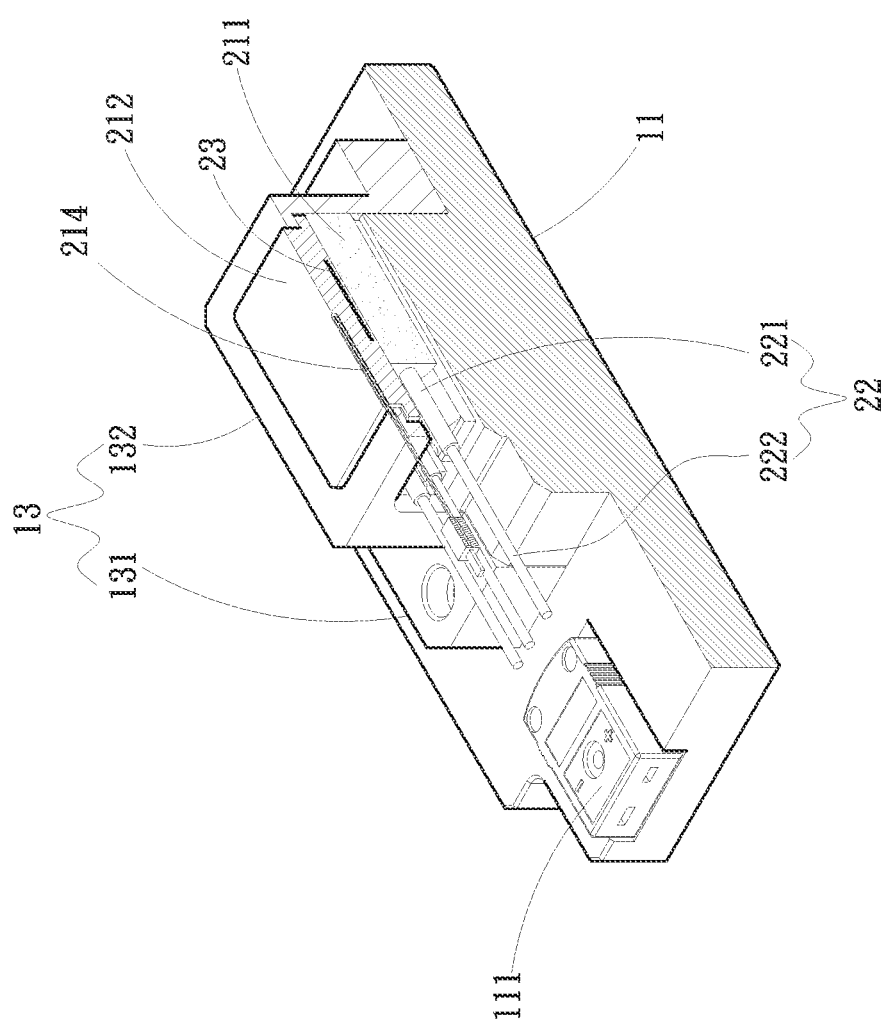

Please refer to FIGS. 1 to 4. FIG. 1 is a perspective assembled view of the heat source simulation structure of the present invention. FIGS. 2A and 2B are perspective exploded views of two embodiments of the heat source simulation structure of the present invention. FIGS. 3 and 4 are partially sectional assembled views of the heat source simulation structure of the present invention according to FIG. 1. The heat source simulation structure 100 of the present invention includes a carrier body 1, an outer case 13 and a heat source main body 2. The carrier body 1 includes a base seat 11 and a heating substrate 12. The base seat 11 and the heating substrate 12 can be integrally formed as the carrier body 1 as shown in FIG. 2A. Alternatively, the base seat 11 and the heating substrate 12 can be separately formed as shown in FIG. 2B, wherein the heating substrate 12 is overlaid on the base seat 11 to form the carrier body 1. The structure of the carrier body 1 will be specifically described hereinafter.

The base seat 11 has a top face 11a. A temperature monitoring port 111 and a mounting section 112 are disposed on the top face 11a. In this embodiment, the mounting section 112 is such as a mounting socket, a mounting hole or the like.

The heating substrate 12 is disposed on one side of the top face 11a of the base seat 11. The heating substrate 12 has a first block 121 and a second block 122 positioned on one side of the first block 121. The longitudinal sectional area of the second block 122 is smaller than the longitudinal sectional area of the first block 121, whereby at least one shoulder section R1 (there are two in this embodiment) is formed at the junction between the first and second blocks 121, 122. The shoulder sections R1 are respectively in adjacency to the left and right sides of the second block 122.

The outer case 13 includes a hollow case bottom frame 131 and a hollow case cover 132 connected with upper side of the case bottom frame 131. The case bottom frame 131 and the case cover 132 together define a receiving space 133 therein. A first notch 134 is formed on one side of the case bottom frame 131 and a second notch 135 is formed on the same side of the case cover 132. The first notch 134 (positioned on the case bottom frame 31) and the second notch 135 (positioned on the case cover 132) is, but not limited to, in communication with each other.

In this embodiment, two sides of the first notch 134 of the case bottom frame 131 are formed with two opposite restriction sections R2 as shown in FIGS. 2A and 2B. The first notch 134 serves to receive the second block 122 of the heating substrate 12. The two restriction sections R2 serve to correspondingly restrict the two shoulder sections R1 between the first and second blocks 121, 122. The top face of the case cover 132 of the outer case 13 is formed with a display window 136 in communication with the receiving space 133. The heating substrate 12 is capped in the outer case 13.

The heating substrate 12 and the outer case 13 can be made of high-temperature-resistant insulation material, such as, but not limited to, fiber glass with low heat conductivity. Preferably, the fiber glass has the properties of insulation, high-temperature-resistance, anticorrosion, etc. Accordingly, the heating substrate 12 and the outer case 13 have heat insulation and electro-insulation effect.

The temperature monitoring port 111 can be electrically connected with a data collection meter for recording the temperature of the upper surface of the heating body 21 of the heat source main body 2.

The heat source main body 2 is disposed in the receiving space 133 of the outer case 13. The heat source main body 2 includes a heating body 21, at least one heating member 22 and at least one thermocouple member 24.

In this embodiment, the heating body 21 includes a heating block 211 and a heating core 212 overlaid on the heating block 211 as shown in FIGS. 2A and 2B. One side of the heating block 211 is formed with through holes 213 corresponding to the heating members 22 for one end thereof to plug in and locate. The heating core 212 is disposed on the top face of the heating block 211. The cross-sectional area of the heat core 212 is at least equal to the size of the display window 136 of the outer case 13. In addition, a mounting recess 214 is formed on one face of the heating core 212 in a specific position. It should be specifically noted that both the through holes 213 of the heating block 211 and the mounting recess 214 of the heating core 212 are positioned on the same side corresponding to the second notch 135 of the case cover 132 of the outer case 13.

Moreover, as shown in FIGS. 3 and 4, in order to enhance the heated speed of the heating block 211 and maintain the temperature itself, a heating filament (or heating resistor filament) 23 is embedded in the heating block 211. Alternatively, the heating block 211 is formed with internal passage for placing the heating filament therein. In this embodiment, the number and the position of the heating filament 23 disposed in the heating block 211 are not limited. The heating filament is, but not limited to, a high-temperature-resistant iron-chrome-aluminum alloy electrical heating filament, a high-temperature-resistant nickel-chrome alloy electrical heating filament or the like.

The heating member 22 is, but not limited to, an electrical heating pipe or heating bar. The heating member 22 has a first end 221 and a second end 222 opposite to the first end 221. The first end 221 of the heating member 22 is received in the through hole 213 of the heating block 211. The junction between the first end 221 and the through hole 213 can be welded to connect the first end 221 in the through hole 213 so as to avoid greater contact thermal resistance between the heating member 22 and the heating body 21. The second end 222 of the heating member 22 properly extends out of the second notch 135 of the case cover 132 corresponding to the outer case 13. In addition, the second end 222 has leads of positive and negative electrodes for electrically connecting with an external power supply (not shown). By means of the external power supply, most of the heat of the heating member 22 is transferred to the heating body 21 to heat the heating body 21. By means of controlling the voltage of the external power supply, the amount of the generated heat and power of the heating member 22 (electrical heating pipe or heating bar) can be controlled and corrected in time to achieve a heat manner equivalent to an electronic component such as an IGBT, a diode or a MOSFET high-power amplifier.

One end of the thermocouple member 24 is mounted in the mounting recess 214 formed on one face of the heating core 212 and positioned on one side of the heating body 21 distal from the heating member 22. The thermocouple member 24 serves to accurately monitor and measure the temperature of the heating body 21. The thermocouple member 24 is, but not limited to, arranged in the heating body 21 by different depths.

To speak more specifically, in order to precisely monitor the temperature of the heating block 211, the mounting recess 214 formed on one face of the heating core 212 has an outer diameter approximate to the size of the thermocouple member 24 in adaptation thereto, whereby one end of the thermocouple member 24 can be snugly inserted into the mounting recess 214. The mounting recess 214 is positioned on an edge of the heating core 212 to properly extend to a central section thereof. The mounting recess 214 at the central section is for the thermocouple member 24 to insert in to measure the temperature of the surface of the heating core 212 near the center. The mounting recess 214 on the edge generally is for helping in measuring the temperature of the surface of the heating core 212.

The heating body 21 and the heating member 22 are made of high-temperature-resistant material such as, but not limited to, copper or stainless steel.

The through holes 213 of the heating body 21 extend in a lengthwise direction of the base seat 11. Alternatively, the through holes 213 extend in a widthwise direction of the base seat 11.

The size and area of the heating body 21 and the number of the heating member 22 are substantially designed according to the actual value of the heating power and the size, area and configuration of the chip or other electronic component. For example, the heating body 21 is enlarged by about 0.5 mm-3 mm or the like on the basis of the size of the chip.

There are, but not limited to, multiple thermocouple members 24. One end of each of the multiple thermocouple members 24 is inserted in the mounting recess 214 formed on one face of the heating core 212. The multiple thermocouple members 24 are distributed in the heating body 21 by different depths.

According to the above arrangement, referring to FIGS. 1 to 4, the heating substrate 12 is first disposed on the top face of the base seat 11. Then the bottom face of the heating body 21 is overlaid on the heating substrate 12. Then the first end 221 of the heating member 22 is received in the through hole 213 of the heating block 211 and the junction therebetween is connected (coupled) by means of welding so as to connect the heating member 22 with the heating block 211. One end of the thermocouple member 24 is mounted in the mounting recess 214 formed on one face of the heating core 212 of the heating body 21 to form the heat source main body. Finally, the heating body 21 and the heating substrate 12 are received and enclosed in the receiving space 133 of the outer case 13. The case bottom frame 131 of the outer case 13 is secured on the mounting section 112 of the top face 11a of the base seat 11 by means of screws. The second end 222 of the heating member 22 and the other end of the thermocouple member 24 extend out of the second notch 135 of the case cover 132 of the outer case 13. In addition, the second end 222 of the heating member 22 extends out of the outer case 13 to electrically connect with the external power supply so as to heat the heating body 21. The thermocouple member 24 serves to measure the temperature of the heating body 21. By means of the other end of the thermocouple member 24 that extends out of the outer case 13, the temperature value of the heating body can be accurately monitored and measured. Furthermore, the temperature monitoring port 111 is connected with a data collection meter for recording the temperature of the upper surface of the heating body 21.

Accordingly, the heat source main body 2 has a property of heat insulation to reduce the contact heat resistance between the heating member and the heating body. The heat source main body 2 is enclosed in the outer case and the heating substrate 12 to have heat insulation and heat preservation effect. In this case, the heat source main body is prevented from dissipating heat so as to enhance the measurement precision and reliability.

The heat source simulation structure 100 of the present invention can be solely used or synchronously used with a test platform.

Please refer to FIGS. 1 to 4. The heat source simulation structure 100 of the present invention will be more specifically described as follows:

On the basis of the above arrangement and structural design, relevant tests and analyses reveal that the heat loss (Q loss/heat loss) of the heat source simulation structure 100 of the present invention is smaller than (<) 4%. This has critical meaning with respect to enhancement of the reliability and precision of the test data. The substantial connection relationship and requirement between them are shown in the following tables 1 and 2:

(Tables 1 and 2)

In the present invention, the heating member 22 and the heating body 21 with mutual heat conduction effect are coupled into the simulation heat source main body 2 so as to avoid greater contact heat resistance. In addition, the heat source main body 2 is enclosed in the outer case 13 and the heating substrate 12 made of fiber glass with low heat conductivity for insulating heat so that the heat of the heating member 22 and the heating body 21 is prevented from dissipating (by way of heat radiation and environment radiation). The measurement and analysis are performed in such a manner that the thermocouple member 24 measures the temperature of the heating body 21 to accurately monitor the temperature value. The temperature monitoring port 111 is electrically connected with a data collection meter for recording the temperature of the upper surface (heating face) of the heating body 21. Accordingly, the measurement precision and reliability are enhanced and the structure is simple and the operation is facilitated.

When measuring the temperature, the thermocouple members 24 arranged by different depths in different radial positions serve to measure the temperature of the heating body 21. The temperature monitoring port 111 is electrically connected with a data collection meter for recording the temperature of the heating face of the heating body 21. For example, when measuring the temperature value of the heating body 21, in case a abrupt rising point of the value appears, the heating power of the heating member 22 and the heating filament 23 is regulated, whereby the amount of the heat transferred from the heating body 21 to the chip is equal to the amount of the heat dissipated from the chip to the environment so as to finally achieve a system for compensating the chip heat dissipation loss.

This avoids affection of the heat loss of the heating body 21 on the measurement result. Accordingly, the measurement precision and reliability are enhanced.

The present invention has been described with the above embodiments thereof and it is understood that many changes and modifications in such as the form or layout pattern or practicing step of the above embodiments can be carried out without departing from the scope and the spirit of the invention that is intended to be limited only by the appended claims.

What is claimed is:

1. A heat source simulation structure comprising:
   a carrier body, being heat-insulative and electro-insulative and including a base seat having a top surface, a heating substrate disposed on a top side of the base seat, and a temperature monitoring port disposed on the base seat for electrically connecting with a data collection meter;
   an outer case, being heat-insulative and electro-insulative and having a case bottom frame and a case cover connected with the case bottom frame, the case bottom frame correspondingly capped on the carrier body and located on the top surface of the base seat, the outer case and the carrier body together defining internally therebetween a receiving space, the case cover having a notch; and
   a heat source main body including:
      a heating body covered by the outer case in the receiving space and disposed on the heating substrate in contact with the heating substrate, at least one through hole being disposed on one side of the heating body, other sides of the heating body enclosed by the outer case and the carrier body, wherein the data collection meter records the temperature of the heating body via the temperature monitoring port;
      at least one heating member, one end of the heating member being disposed in the through hole of the heating body, the other end of the heating member extending out of the notch of the outer case to electrically connect with an external power supply for heating the heating body; and
      at least one thermocouple member disposed on one side of the heating body.

2. The heat source simulation structure as claimed in claim 1, wherein the junction between the end of the heating member and the through hole is welded to connect the end of the heating member and the through hole.

3. The heat source simulation structure as claimed in claim 1, wherein a heating filament or a heating resistor filament is disposed in the heating body.

4. The heat source simulation structure as claimed in claim 1, wherein the heating body and the heating member are made of copper or stainless steel.

5. The heat source simulation structure as claimed in claim 1, wherein the heating member is an electrical heating pipe or a heating bar.

6. The heat source simulation structure as claimed in claim 1, wherein the outer case and the heating substrate are made of fiber glass with heat insulation and electrical insulation effect.

7. The heat source simulation structure as claimed in claim 1, wherein the outer case is disposed on one side of the heating body distal from the base seat for insulation and heat transfer.

8. The heat source simulation structure as claimed in claim 1, wherein the heat source simulation structure is solely used or synchronously used with a test platform.

* * * * *